(12) United States Patent
Hadden (10) Patent No.: US 7,374,296 B2
(45) Date of Patent: May 20, 2008

(54) REFLECTIVE CORNER CUBE ARRAY

(75) Inventor: George D. Hadden, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 293 days.

(21) Appl. No.: 11/202,757

(22) Filed: Aug. 12, 2005

(65) Prior Publication Data

US 2007/0035835 A1    Feb. 15, 2007

(51) Int. Cl.
*G02B 5/122*    (2006.01)
*G01B 11/14*    (2006.01)

(52) U.S. Cl. .................. 359/529; 359/900; 356/614

(58) Field of Classification Search ..................... None
See application file for complete search history.

(56) References Cited

U.S. PATENT DOCUMENTS

| | | | | |
|---|---|---|---|---|
| 3,977,765 A | * | 8/1976 | Lipkins | 359/529 |
| 5,109,362 A | * | 4/1992 | Berni | 367/14 |
| 5,589,981 A | * | 12/1996 | Kasser et al. | 359/529 |
| 6,655,215 B2 | | 12/2003 | Hadden | |
| 2002/0118373 A1 | * | 8/2002 | Eviatar et al. | 356/614 |

* cited by examiner

*Primary Examiner*—James Phan
(74) *Attorney, Agent, or Firm*—Ingrassia, Fisher & Lorenz, P.C.

(57) ABSTRACT

The present invention relates to vibration detection devices. In one embodiment a corner reflective array is provided. The corner reflective array includes at least one corner cube. Each corner cube includes three mutually perpendicular reflective surfaces that intersect in a corner.

7 Claims, 11 Drawing Sheets

REFLECTIVE CORNER CUBE ARRAY

TECHNICAL FIELD

The present invention relates to vibration detection devices and in particular to devices that measure vibration in select directions.

BACKGROUND

It is often desirable to measure the vibration of an object to evaluate how the object is performing. An excess amount of vibration can indicate possible problems. One type of device for measuring the vibration of an object is a laser doppler vibrometer (LDV). A LDV measures the vibration of an object without contact. Basically, a LDV works by reflecting a laser signal off of a surface of an object. The LDG then compares the frequency of the reflected signal with the original signal. A change in frequency (Doppler shift) indicates vibration (or movement) of the object. Moreover, the measured change in frequency is used to calculate the vibration of the object.

Although LDV devices work in many applications their use has some limitations. For example, it is difficult to align light sensors of the LDV to receive the reflected laser light. Moreover, it is difficult with current LDV designs to obtain vibration measurements in multiple dimensions or multiple directions.

For the reasons stated above and for other reasons stated below, which will become apparent to those skilled in the art upon reading and understanding the present specification, there is a need in the art for a vibration detection system using a LDV that provides for easy sensor alignment and vibration measurements in multiple dimensions.

SUMMARY

The above-mentioned problems and other problems are resolved by the present invention and will be understood by reading and studying the following specification.

In one embodiment of the invention, a corner reflective array is provided. The corner reflective array includes at least one corner cube. Each corner cube includes three mutually perpendicular reflective surfaces that intersect in a corner.

In another embodiment, another corner reflective array is provided. The corner reflective array includes one or more corner arrays. Each corner array includes a first, second and third reflective surface. The first reflective surface is positioned in a plane along a first axes. The second reflective surface positioned in a plane along a second axes and the third reflective surface positioned in a plane along a third axes.

In still another embodiment, a vibration test system is provided. The test system includes one or more motion sensing devices and at least one corner cube. The one or more motion sensing devices are adapted to reflect laser signals off of a reflective surface and determine motion via the reflected laser signals. Each corner cube includes three mutually perpendicular reflective surfaces that intersect in a corner. Each reflective surface is adapted to reflect the laser signals from the one or more motion sensing devices. Moreover, the at least one corner cube is adapted to be coupled to an object under test.

In yet another embodiment, a method of testing vibrations in an object is provided. The method comprises attaching at least one corner cube to the object. Each corner cube includes three mutually perpendicular reflective surfaces that intersect in a corner. Reflecting at least one laser signal off of at least one of the reflective surfaces of a corner cube and determining the motion of the object in the direction of the at least one reflected laser signal.

In yet still another embodiment a method of determining the vibration of an object is provided. The method comprises attaching a corner reflective array having at least one corner cube to an object to be tested. Each corner array including a first, second and third reflective surface. The first reflective surface positioned in a plane along a first axes. The second reflective surface positioned in a plane along a second axes. The third reflective surface positioned in a plane along a third axes, wherein the first, second and third axes are mutually perpendicular to each other. Reflecting a first laser signal off of a corner cube and determining the motion of the object in the direction of the first laser signal based on the reflected first laser signal.

In another embodiment, a method of determining vibration of an object in three dimensions is provided. The method comprises directing one or more sets of laser signals at one or more corner cubes of a corner cube array attached to the object. Each set of laser signals includes non-coplanar first, second and third laser signals. The method further includes determining the vibration of the object in three dimensions based on at least one set of laser signals reflected off of the one or more corner cubes of the corner cube array.

In further another embodiment, a motion detection device is provided. The motion detection device includes a corner cube array means adapted to reflect laser beams back in the direction they were received from and a means to determine the motion in the direction of the reflected laser beam.

BRIEF DESCRIPTION OF THE DRAWINGS

The present invention can be more easily understood and further advantages and uses thereof are more readily apparent, when considered in view of the description of the specific embodiments and the following figures in which.

In accordance with common practice, the various described features are not drawn to scale but are drawn to emphasize specific features relevant to the present invention. Reference characters denote like elements throughout Figures and text.

DETAILED DESCRIPTION

In the following detailed description of specific embodiments, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be made utilized and that logical, mechanical and electrical changes may be made without departing from the spirit and scope of the present invention. The following detailed description is, therefore, not to be taken in a limiting sense, and the scope of the present invention is defined only by the claims and equivalents thereof.

Embodiments of the present invention provide corner reflective arrays having tri-corner cubes that allow a LDV, or similar device, to measure vibration information of an object in different directions. In particular, in embodiments of the present invention, each tri-corner cube (or corner cube) includes three mutually perpendicular panels with reflective surfaces. The three panels in each corner cube intersect at a corner. The reflective surfaces may be mirrored or made from a reflective metal in some other way. In addition, it is sometimes desired to determine the vibration of an object at a select location on the object. Accordingly, embodiments of the present invention allow for a LDV system, or similar system, to obtain vibration measurements in multiple directions at a single location.

Figure 1A:
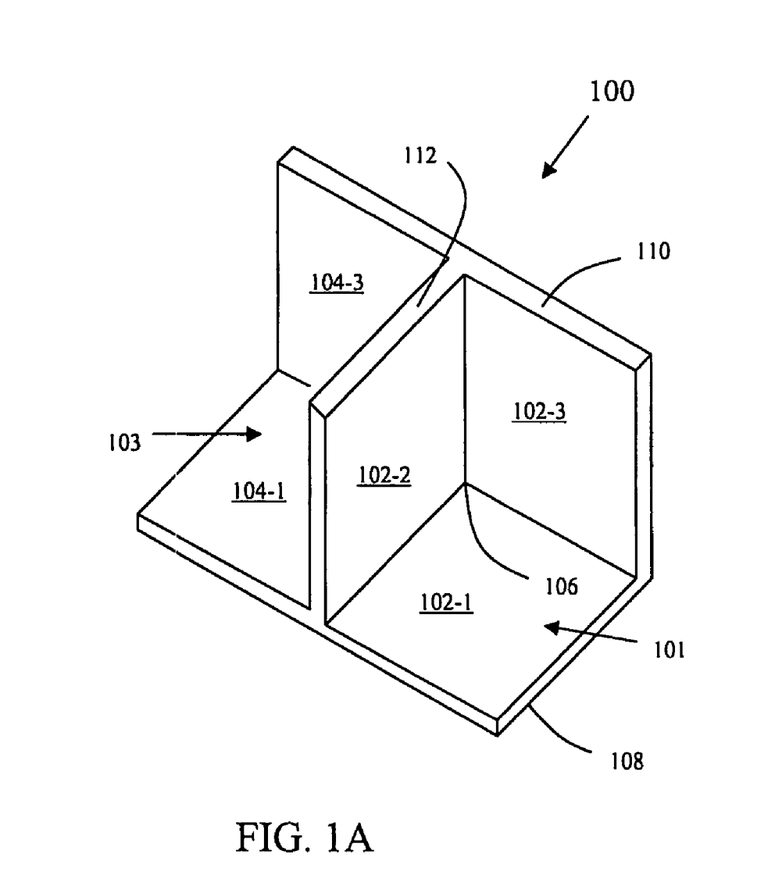
FIG. 1A is an isometric view of a reflective device of one embodiment of the present invention.

Referring to FIG. 1A, an isometric view of a bi-corner reflective array 100 (or bi-corner array 100) of one embodiment of the present invention is disclosed. As illustrated, this embodiment includes panels 108, 110 and 112. Each panel 108, 110 and 112 is positioned so that each panel 108, 110 and 112 is mutually perpendicular to the other panels. In the embodiment of FIG. 1A, the panels are positioned to form two corner cubes 101 and 103. Embodiments of the present invention include one or more corner cubes. Reflective surfaces are attached to the panels 108, 110 and 112 to form the reflective array 100. In particular, reflective surfaces 102-1 through 102-3 are attached to each of the panels 108, 110 and 112 to form reflective corner cube 101 and reflective surfaces 104-1 through 104-3 are coupled to respective panels 108, 110 and 112 to form reflective corner cube 103. In embodiments of the present inventions, the reflective surfaces of each corner cube meet at a corner. For example, referring to corner cube 101 the reflective surfaces 102-1 through 102-3 meet at corner 106. Referring to the top view of the bi-corner reflective array 100 of FIG. 1B, the reflective surfaces 104-1 through 104-3 meet at corner 108.

Figure 1B:
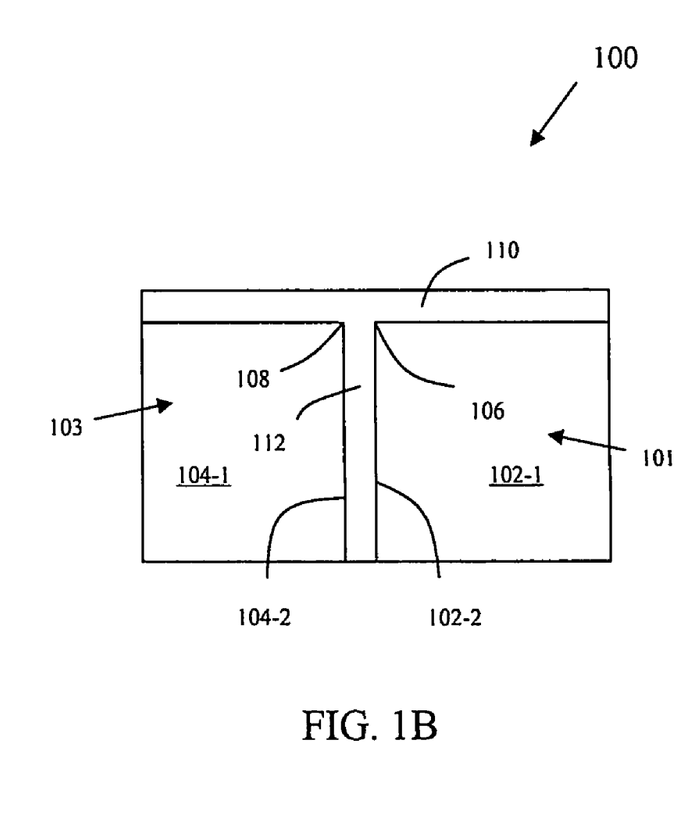
FIG. 1B is a top view of the reflective device of FIG. 1A.
Figure 1C:
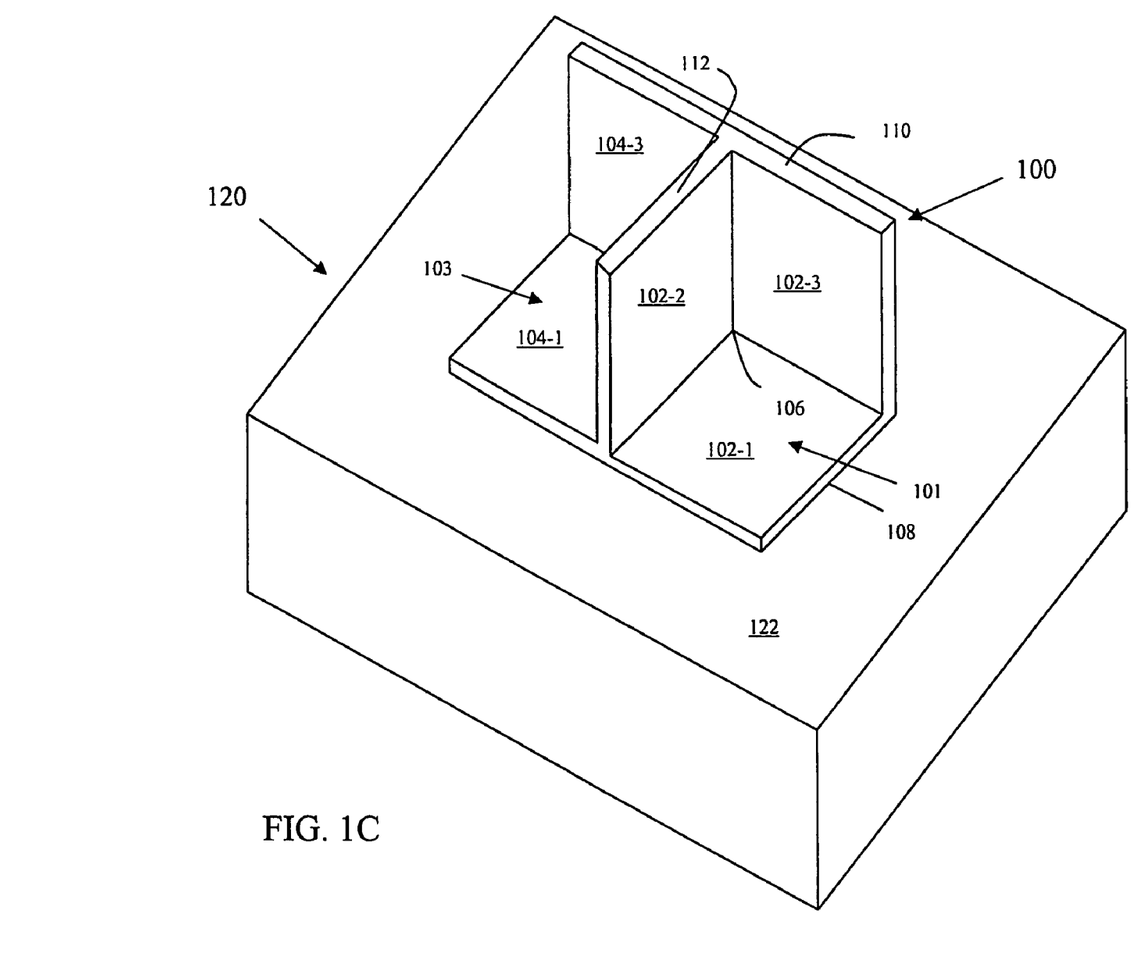
FIG. 1C is an isometric view of a reflective device of FIG. 1A attached to an object under test.

Referring to FIG. 1C the bi-corner reflective array 100 is illustrated as being attached to a surface 122 of an object under test 120. Since each corner cube 101 and 103 has three reflective surfaces that are mutually perpendicular to each other, vibration information in three axes can be determined by reflecting laser beams off the each of the reflective panels and measuring the doppler shift. For example, referring to corner cube 101, three lasers (or a single laser in combination with a beam splitter) can be used to reflect a laser signal off of a respective reflective surface 102-1, 102-2 and 102-3 to determine the Doppler shift in three axes. This can be used to determine the vibration of the object 120 under test in three axes. Moreover, with the bi-corner array 100 embodiment, two reflective surfaces per axes can be used. Hence, the bi-corner array gives the option of two different reflective surfaces to reflect a laser signal off of rather than a single reflective surface a single corner cube would provide. Accordingly, this allows for greater options in setting up a laser and receiver. For example, referring to FIG. 1C, to determine the vibration in an axis along panel 110, a laser signal can be reflected off of reflective surface 102-3 or reflective surface 104-3.

In addition, the positioning of three mutually perpendicular reflective surfaces that make up each corner cube 101 and 103 and the other corner cubes described herein provide other benefits. For example, no matter the angle that a laser beam (or laser signal) is incident upon a corner cube, the laser signal will be reflected back in the same direction. Therefore, directing a beam on a particular panel is not required and generally aiming does not need to be that precise to determine motion in a particular direction. Moreover, only one corner cube is required in determining information of three perpendicular axes of vibration when three non-coplanar laser beams are directed on the corner cube. In particular, with three non-coplanar laser beams, movement in any three orthogonal directions from a single corner cube can be recovered (or determined). Accuracy requirements and other spatial considerations might dictate that the angles between the beams be greater, however a single corner cube can still be used.

Figure 2A:
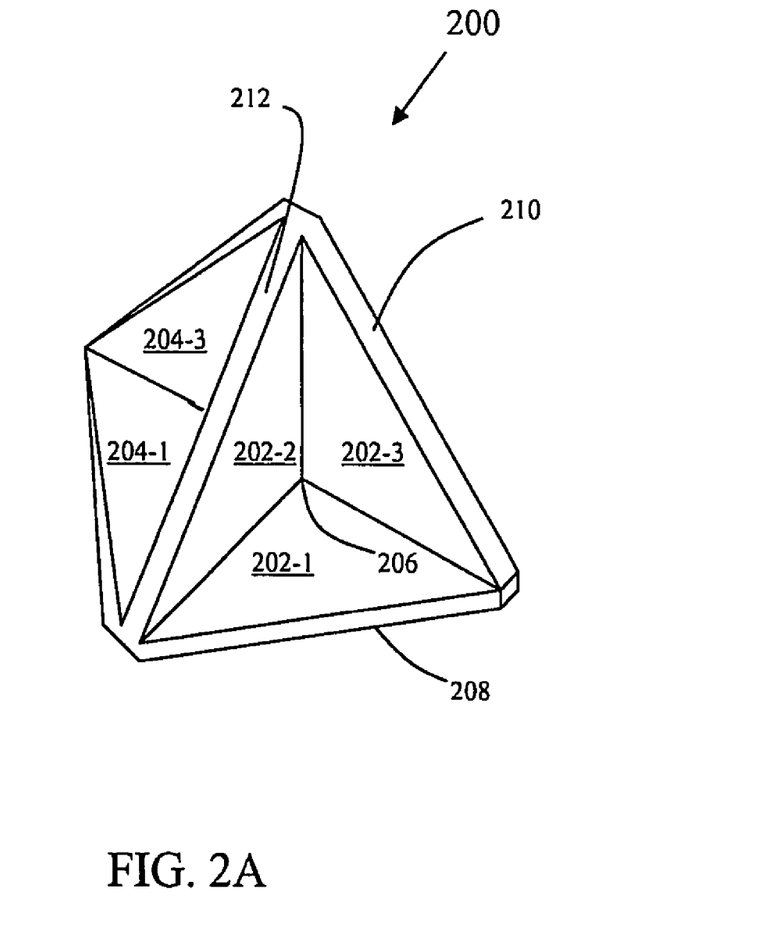
FIG. 2A is an isometric view of another embodiment of a reflective device of the present invention.
Figure 2B:
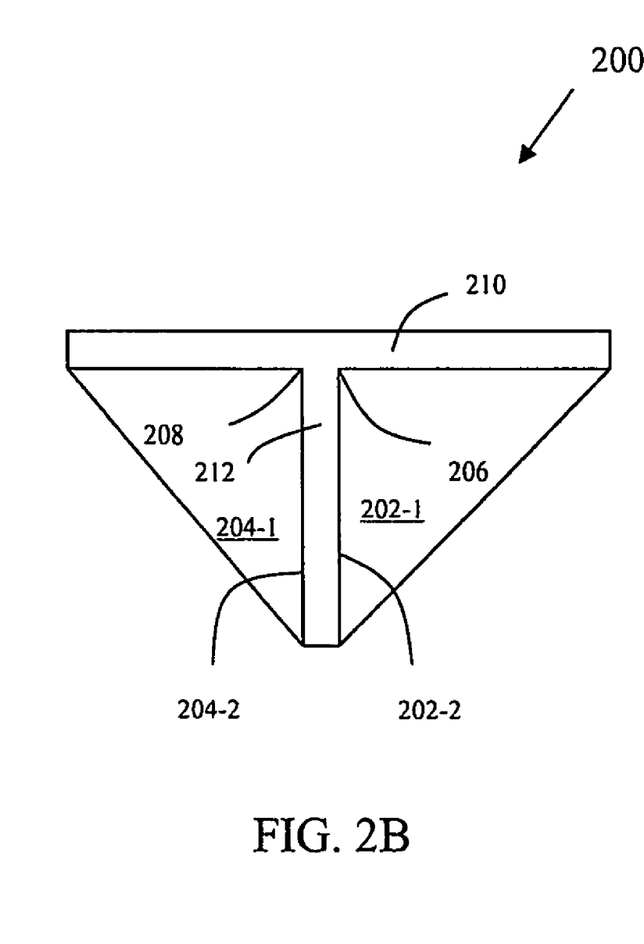
FIG. 2B is a top view of the reflective device of FIG. 2A.
Figure 2C:
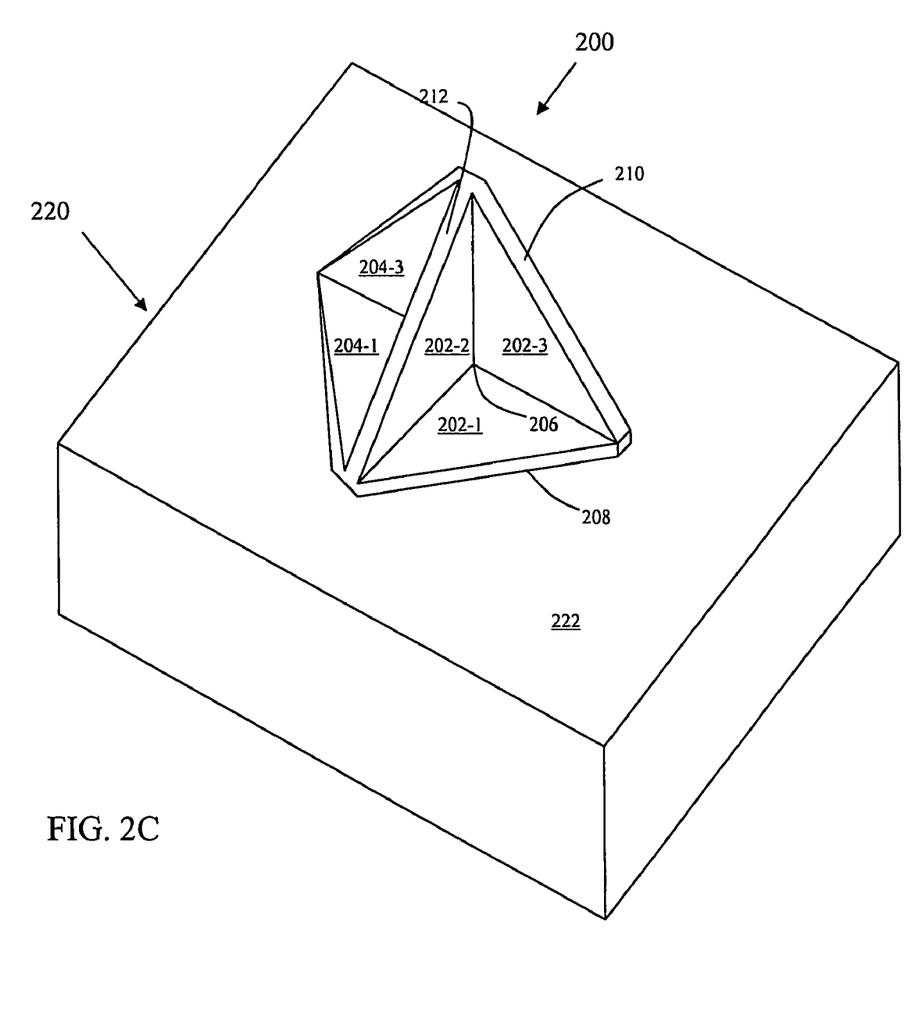
FIG. 2C is an isometric view of the reflective device of FIG. 2A attached to an object under test.

Although FIGS. 1A through 1B illustrate the panels forming corner cubes having reflective surfaces that are square or rectangular in shape, other shapes like semi circles may be used and this invention is not limited to a specific shape of the reflective surfaces. For example, FIG. 2A illustrates a bi-corner reflective array 200 of one embodiment of the present invention using triangle shaped reflective surfaces 201-1 through 201-3 and 204-1 through 204-3. Like the previous embodiments, the panels 208, 210 and 212 upon which the reflective surfaces 201-1 through 201-3 and 204-1 through 204-3 are attached are mutually perpendicular to each other. Moreover, as illustrated in FIG. 2A and the top view of the bi-corner reflective array 200 of FIG. 2B, the reflective surfaces 201-1 through 201-3 form corner 206 and reflective surfaces 204-1 through 204-3 form corner 208. FIG. 2C illustrates the bi-corner reflective array 200 coupled to a surface 222 of an object 220 to be tested for vibration.

Figure 3:
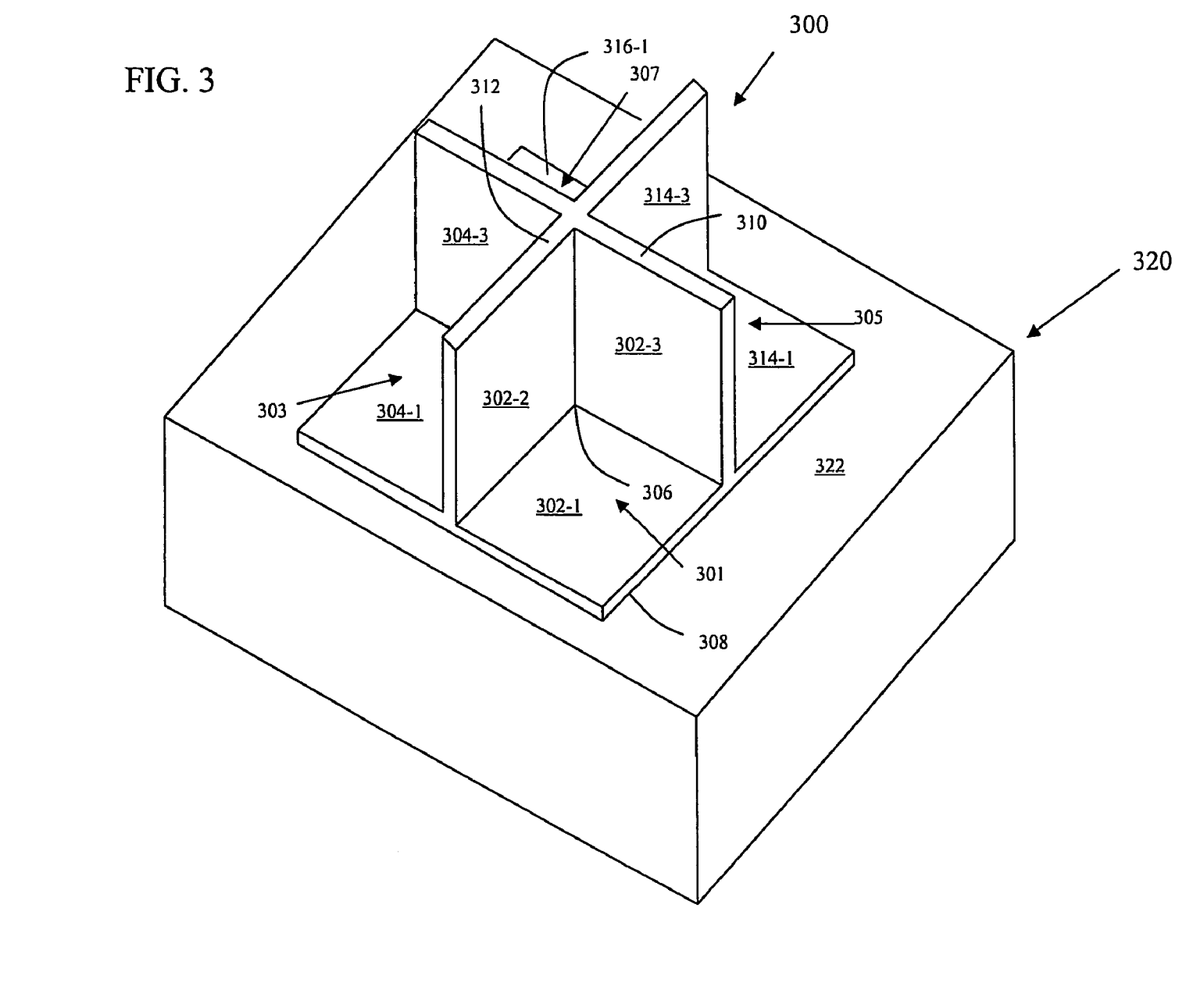
FIG. 3 is an isometric view of another embodiment of a reflective device of the present invention attached to an object under test.

FIG. 3, further illustrates a quad-corner reflective array 300 of another embodiment of the present invention. This embodiment has four corner cubes 301, 303, 305 and 307. The corner cubes 301, 303, 305 and 307 are formed by mutually perpendicular panels 308, 310 and 312. In particular, corner cube 301 is formed by reflective surfaces 302-1 through 302-3 of respective panels 308, 310 and 312 as illustrated. The reflective surfaces 302-1 through 302-3 form corner 306. Corner cube 303 is formed by reflective surfaces 304-1 through 304-3 of respective panels 308, 310 and 312 as illustrated. Similarly, corner cube 305 is formed by reflective surfaces 314-1 through 314-3 of respective panels 308, 310 and 312 as illustrated. In addition, corner cube 307 is formed by reflective surfaces 316-1 through 316-3 of panels 308, 310 and 312 as illustrated. In some embodiments of the present invention, the panels 308, 310 and 112 are double sided mirrors wherein the mirrors make up the reflective surfaces. In other embodiments the reflective surfaces are coupled or attached to the panels 308, 310 and 112. As illustrated in FIG. 3, the quad-corner reflective array 300 is attached to a surface 322 of an object 320 under test.

Figure 4:
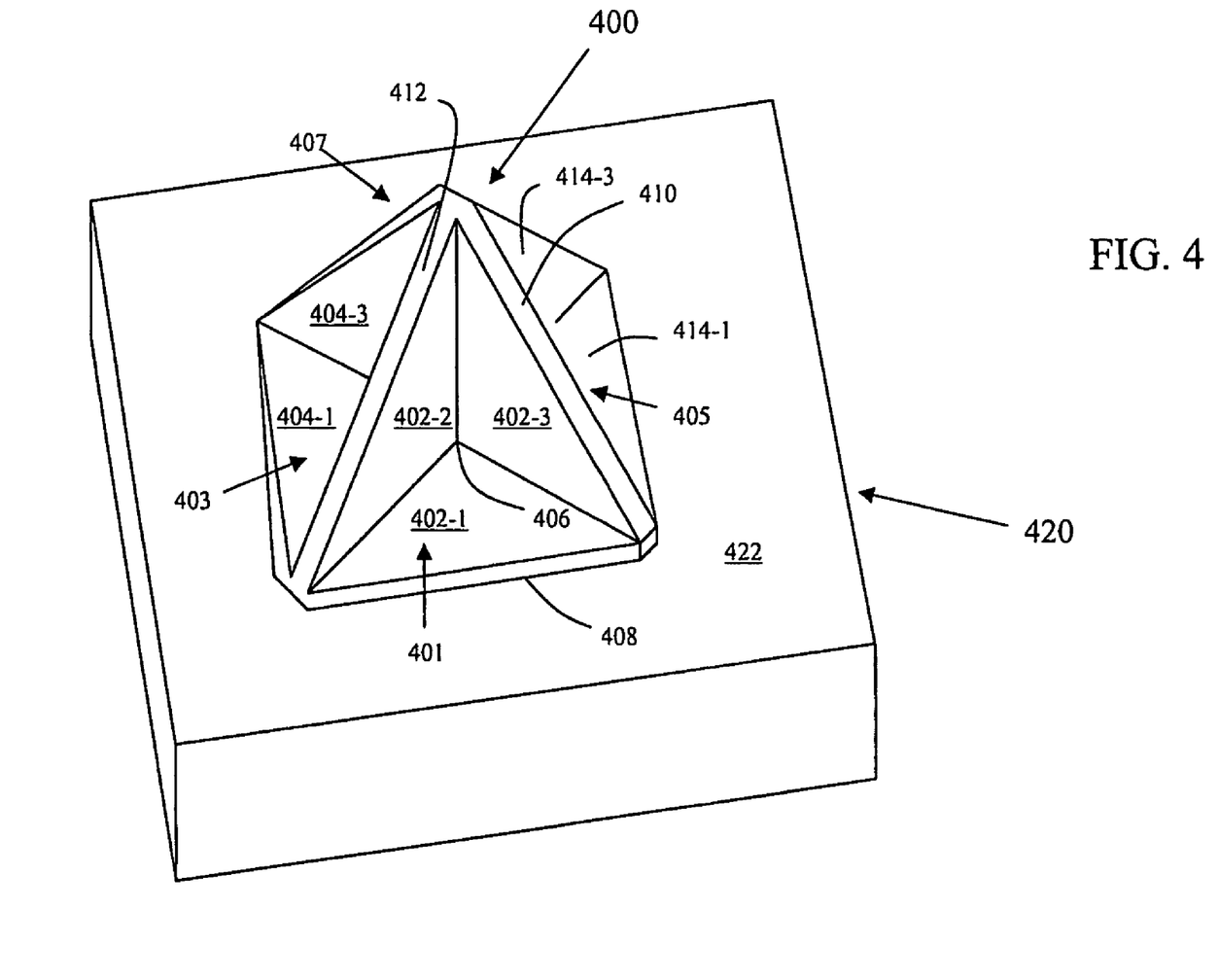
FIG. 4 is a isometric view of another embodiment of a reflective device of the present invention attached to an object under test.

FIG. 4, illustrates another quad-corner reflective array 400 of another embodiment of the present invention. In this embodiment, the reflective surfaces are in a shape of a triangle. This embodiment has four corner cubes 401, 403, 405 and 407. The corner cubes 401, 403, 405 and 407 are formed by mutually perpendicular panels 408, 410 and 412. In particular, corner cube 401 is formed by reflective surfaces 402-1 through 402-3 of respective panels 408, 410 and 412 as illustrated. The reflective surfaces 402-1 through 402-3 form corner 406. Corner cube 403 is formed by reflective surfaces 404-1 through 404-3 of respective panels 408, 410 and 412 as illustrated. Similarly, corner cube 405 is formed by reflective surfaces 414-1 through 414-3 of respective panels 408, 410 and 412 as illustrated. In addition, corner cube 407 is formed by three reflective surfaces of panels 408, 410 and 412. As illustrated in FIG. 3, the quad-corner reflective array 400 is attached to a surface 422 of an object 420 under test.

Figure 5:
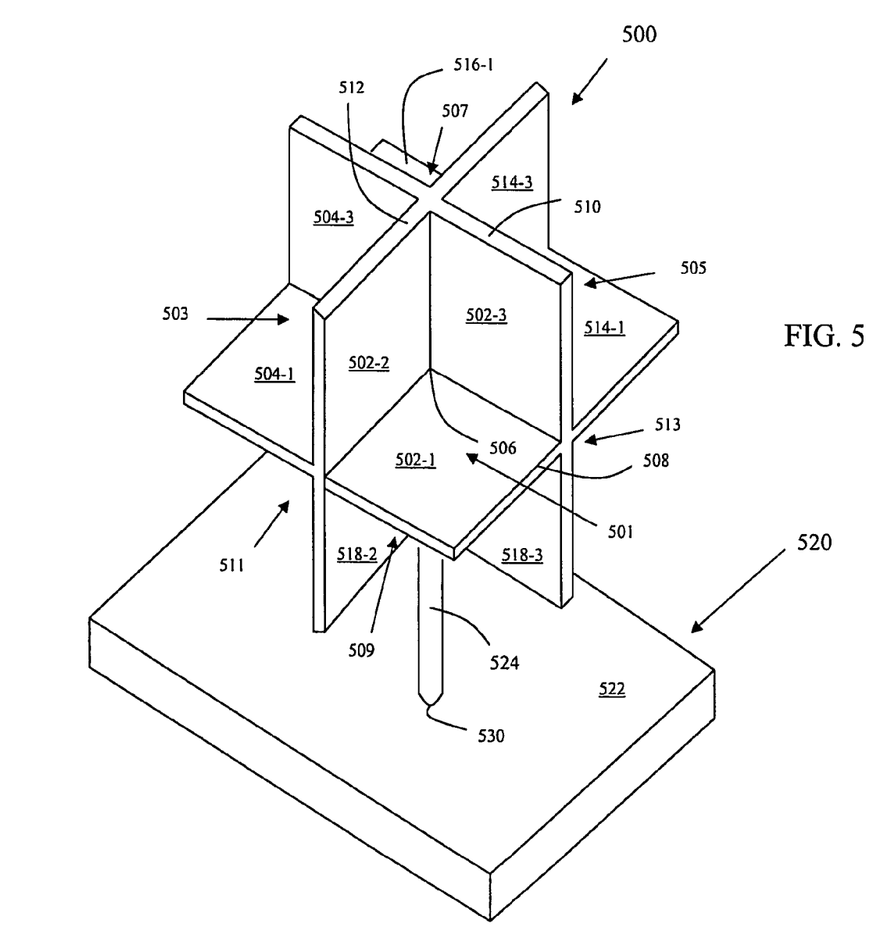
FIG. 5 is a isometric view of yet another embodiment of a reflective device of the present invention attached to an object under test.

Referring to FIG. 5, an octet-corner reflective array 500 of another embodiment of the present invention is illustrated. In this embodiment, eight corner cubes are formed from panels 508, 510 and 512. The eight corner cubes include corner cubes 501, 503, 505, 507, 59, 511 and 513. One of the corner cubes of the octet-corner reflective array 500 cannot be seen in the perspective view of FIG. 5. As illustrated, corner cube 501 is made up of reflective surfaces 502-1 through 502-3. Moreover, reflective surfaces 502-1 through 502-3 form corner 506. Corner cube 503 is made up of reflective surfaces 504-1 through 504-3. Corner cube 505 is made up of reflective surfaces 514-1 through 514-3. Corner cube 507 is made up of reflective surfaces 516-1 through 516-3. Corner cube 509 is made up of reflective surfaces 518-1 through 518-3. In the embodiment of FIG. 5, the octet-corner reflective array 500 is coupled to a location 530 on the surface 522 of an object 520 under test via connection rod 524. In this embodiment, the vibration (or motion) of the object 520 at the particular location 530 can be determined in different directions.

Figure 6:
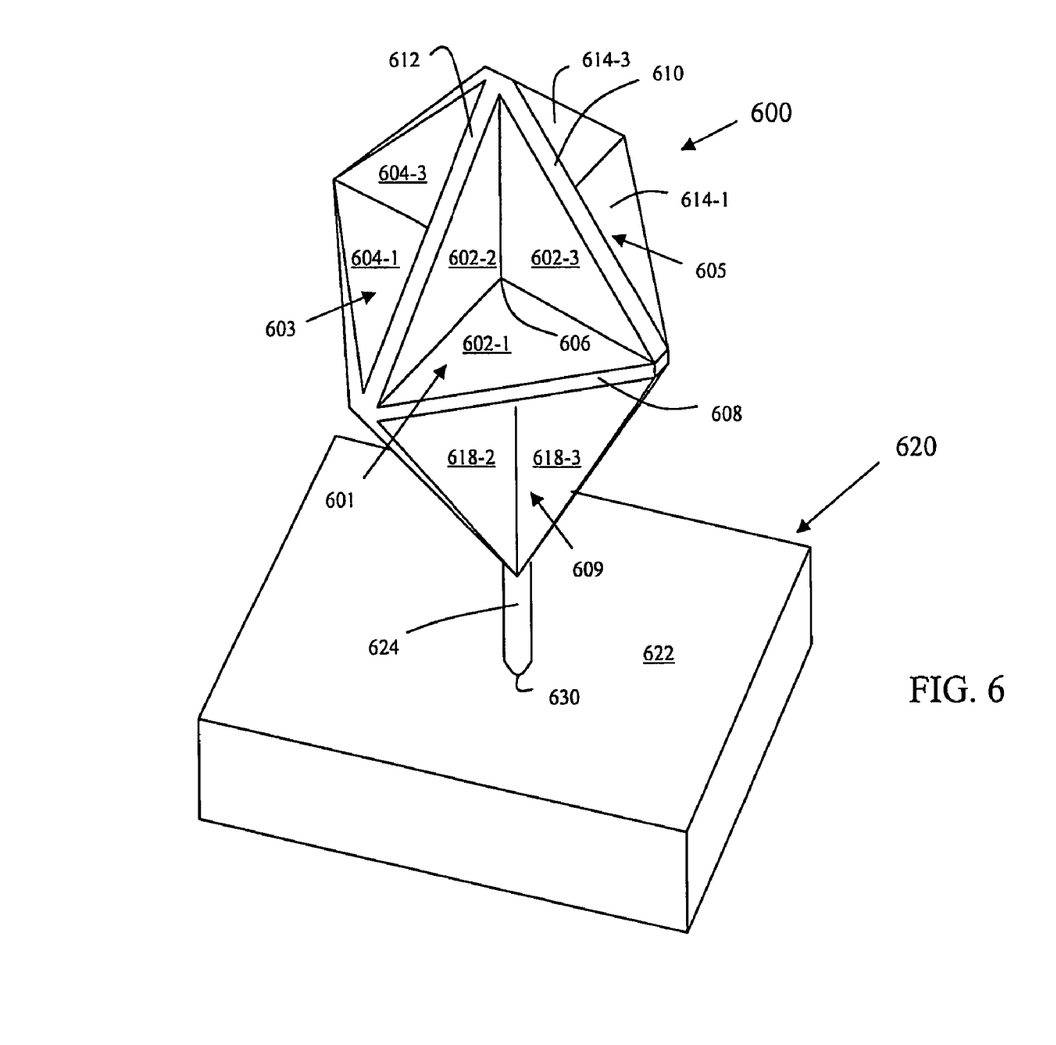
FIG. 6 is a isometric view of still another embodiment of a reflective device of the present invention attached to an object under test.

Another octet-corner reflective array 600 of another embodiment of the present invention is illustrated in FIG. 6. In this embodiment panels 608, 610 and 612 are positioned to form eight corner cubes having triangular shaped reflective surfaces. For example, corner cube 601 includes triangular shaped reflective surfaces 602-1 through 602-3 that form corner 606; corner cube 603 includes triangular shaped reflective surfaces 604-1 through 604-3; corner cube 605 includes triangular shaped reflective surfaces 614-1 through 614-3; and corner cube 609 includes triangular shaped reflective surfaces 618-1 through 618-3. The octet-corner reflective cube 600 is coupled to a location 630 on the surface 622 of an object under test.

Figure 7:
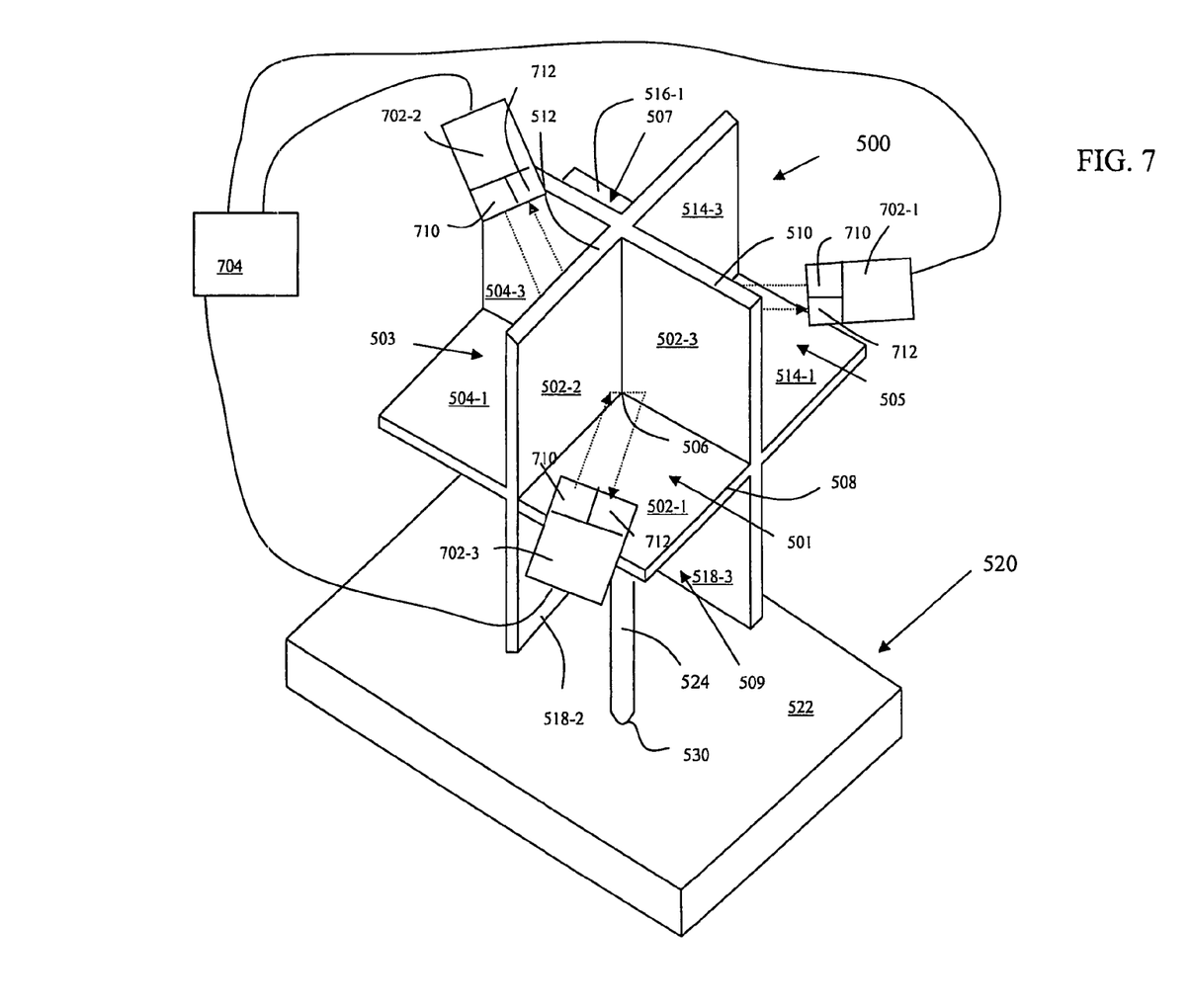
FIG. 7 is a isometric view of a reflective device of FIG. 5 attached to an object under test with a LVD system applied.

Referring to FIG. 7, a system of testing vibration in three orthogonal directions at the location 530 on the surface 522 of the object 520 under test using the octet-corner reflective array 500 of FIG. 5 is illustrated. As illustrated, motion sensing devices 702-1 through 702-3, such as lasers circuits, are used to determine vibration of the object 520 at location 530. Each motion sensing device 702-1 through 702-3 includes a laser beam generating circuit 710 and a laser beam detection circuit 712. Each laser beam generating circuit 710 transmits a laser beam. Each laser beam detector circuit 712 is designed to receive reflected laser beam signals. As illustrated in FIG. 7, motion sensing device 702-1 emits and receives a laser signal or beam that is reflected off of corner cube 501. In this example, the laser beam will measure the movement of the object 520 in the direction of the laser beam, no matter what the orientation of the corner cube 501 with respect to the laser beam. With three independent non-coplanar laser beams (created by laser beam generating circuits 701-1, 701-2 and 701-3), the movement of an object 520 in any three orthogonal directions can be recovered.

Figure 8:
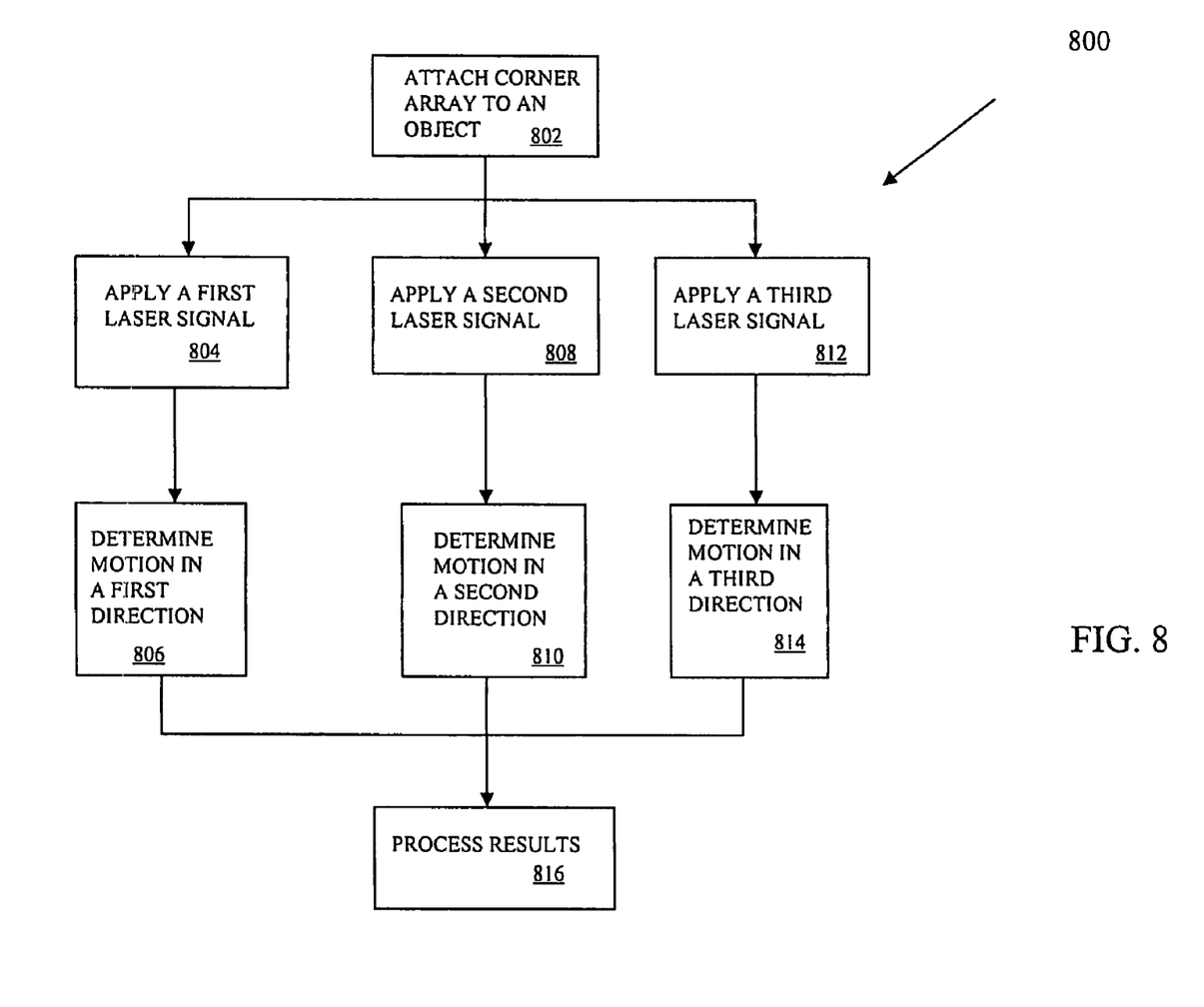
FIG. 8 is a flow diagram of one embodiment of the present invention.

Referring to FIG. 8, a flow diagram 800 of one embodiment of the present invention is illustrated. The flow process starts by attaching an embodiment of a corner reflective array of the present invention to an object to be tested (802). A first laser signal is reflected off of a corner cube of a corner reflective array attached to an object under test (804). A second laser signal is reflected off of a corner cube of the corner reflective array (808). The second laser signal has a path that is not parallel to the path of the first laser signal thus forming a non-zero angle with the path of the first laser signal. A third laser signal is reflected off of a corner cube of the corner reflective array (812). The third laser signal has a path that does not lie in the plane formed by the paths of the first and second laser signal. Movement of the object in the direction of the first laser signal, the second laser signal and the third laser signal is determined (806, 810 and 814). The results of the movements in the specific directions are then processed (816). Using three non-coplanar laser signals on the corner reflective array provides information regarding vibration in three dimensions.

Figure 9:
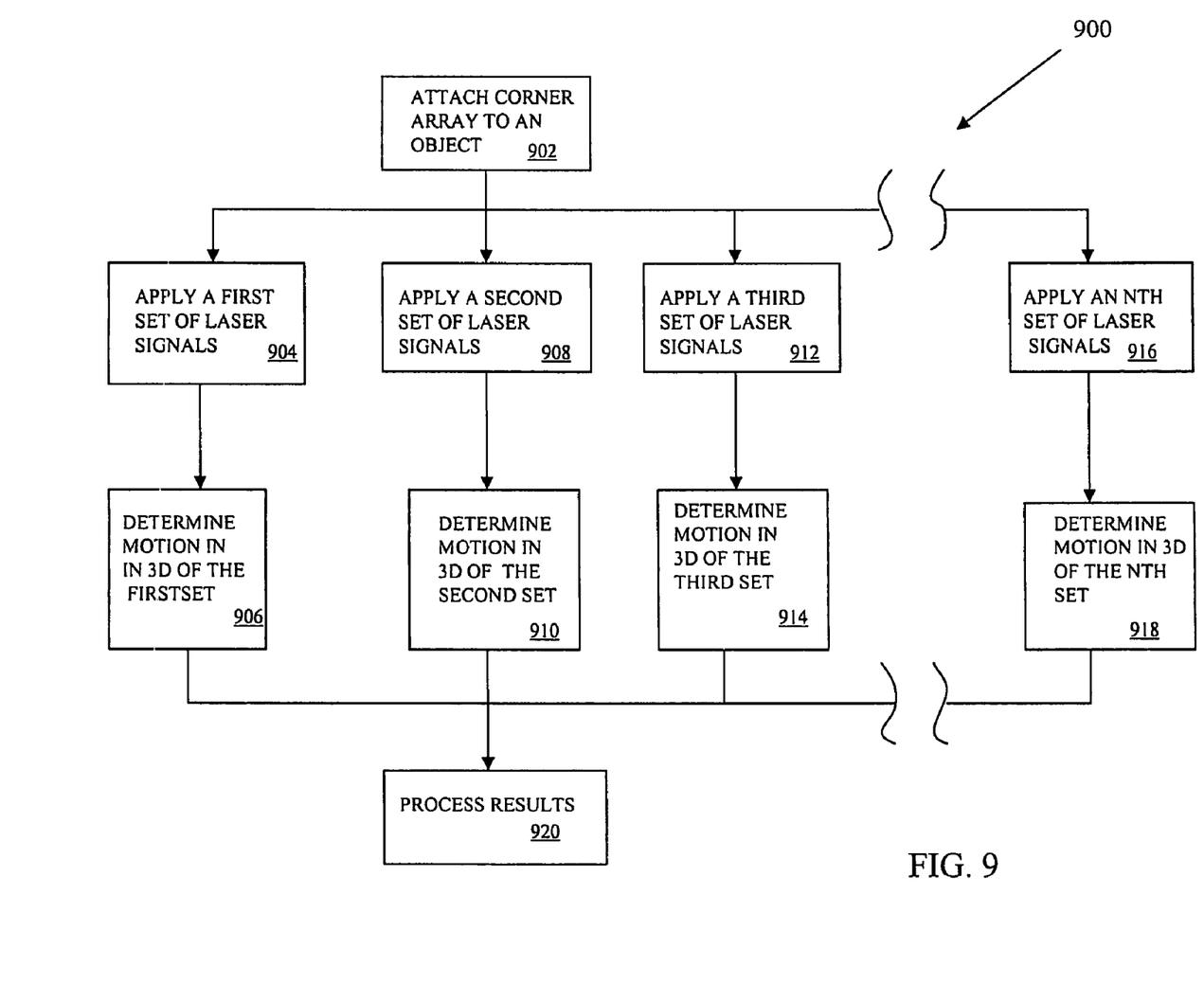
FIG. 9 is a flow diagram of yet another embodiment of the present invention.

Another flow diagram 900 of another embodiment of the present invention is illustrated in FIG. 9. In this embodiment, multiple sets of vibrations in three dimensions are determined and then averaged. In particular, as illustrated in FIG. 9, a first set of laser signals are applied to a corner cube of a corner reflective array (904). A second, third and nth set of laser signals are also applied to the corner reflective array (908, 912 and 916). Each set of laser signals includes first, second and third non-coplanar laser signals. The vibration of an object, detected by the first, second, third and the nth sets of non-coplanar laser signals, in three dimensions are then determined (906, 910, 914 and 918) The results are then processed and the average vibration in three dimensions is presented (920).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A vibration test system, the test system comprising:
   one or more motion sensing devices adapted to emit and receive laser signals off of a reflective surface and determine motion via the laser signals;
   at least one corner cube, each corner cube including three mutually perpendicular reflective surfaces that intersect in a corner, each reflective surface adapted to reflect the laser signals from the one or more motion sensing devices and being made from a double sided mirror, the at least one corner cube adapted to be coupled to an object under test.

2. The test system of claim 1, wherein the at least one corner cube further comprises:
   a connecting rod adapted to connect the at least one corner cube to a location on the object under test.

3. The test system of claim 1, wherein the at least one corner cube further comprises: a first reflective surface positioned in a first dimension, a second reflective surface positioned in a second dimension, and a third reflective surface positioned in a third dimension.

4. The test system of claim 3, wherein the first, second and third reflective surfaces are in the shape of at least one of squares, rectangle, triangles and quarter circles.

5. A method of testing vibrations in an object, the method comprising:

attaching at least one corner cube to the object, each corner cube including three mutually perpendicular reflective surfaces that intersect in a corner, each reflective surface being made from a double sided mirror;

reflecting at least one laser signal off of at least one of the reflective surfaces of a corner cube; and determining the motion of the object in the direction of the at least one reflected laser signal.

6. The method of claim 5, wherein attaching the at least one corner cube further comprises: attaching a connecting rod to a specific location on the object to determine the motion of the object at the specific location.

7. The method of claim 5, wherein determining motions of the object further comprises: determining motion of the object in three dimensions.

* * * * *